(12) United States Patent
Vokinger et al.

(10) Patent No.: US 9,823,097 B2
(45) Date of Patent: Nov. 21, 2017

(54) METHOD FOR DETERMINING ABSOLUTE CODING OF AN OPTICAL CODING TRACK

(71) Applicant: HEXAGON TECHNOLOGY CENTER GMBH, Heerbrugg (CH)

(72) Inventors: Urs Vokinger, Au (CH); Heinz Lippuner, Rebstein (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 341 days.

(21) Appl. No.: 14/412,670

(22) PCT Filed: Jul. 5, 2013

(86) PCT No.: PCT/EP2013/064268
§ 371 (c)(1),
(2) Date: Jan. 2, 2015

(87) PCT Pub. No.: WO2014/006187
PCT Pub. Date: Jan. 9, 2014

(65) Prior Publication Data
US 2015/0144775 A1 May 28, 2015

(30) Foreign Application Priority Data
Jul. 5, 2012 (EP) .................................. 12175130

(51) Int. Cl.
*G01D 5/34* (2006.01)
*G01D 5/347* (2006.01)
(52) U.S. Cl.
CPC .......... *G01D 5/34776* (2013.01); *Y10T 29/49* (2015.01)

(58) Field of Classification Search
CPC ..... G01D 5/345; G01D 5/347; G01D 5/34776
USPC ............ 250/231.13, 231.14, 231.16, 231.18; 33/1 PT, 1 N
See application file for complete search history.

(56) References Cited

U.S. PATENT DOCUMENTS

| 4,931,636 | A | 6/1990 | Huggins |
| 4,964,727 | A | 10/1990 | Huggins |
| 6,304,190 | B1 | 10/2001 | Blasing |
| 6,888,126 | B2 | 5/2005 | Blasing et al. |
| 7,078,677 | B2 * | 7/2006 | Chong ............... G01D 5/34776 250/214 PR |
| 8,242,434 | B2 | 8/2012 | Lippuner |
| 8,309,906 | B2 * | 11/2012 | Kapner .............. G01D 5/24476 250/231.16 |

FOREIGN PATENT DOCUMENTS

| DE | 201 500 A1 | 7/1983 |
| EP | 1 890 113 A1 | 2/2008 |

(Continued)

OTHER PUBLICATIONS

European Search Report dated Dec. 4, 2012 as received in Application No. 12 17 5130.

*Primary Examiner* — Kevin Pyo
(74) *Attorney, Agent, or Firm* — Maschoff Brennan (57) ABSTRACT

The invention concerns a method for determining absolute coding represented by code elements of an optical code track, with illumination of the absolute coding with light, modulating of some of the illuminating light on code elements, determining of the absolute coding as modulated light and continuously varying modulation of the light on neighboring code elements.

20 Claims, 10 Drawing Sheets (56) References Cited

FOREIGN PATENT DOCUMENTS

| SU | 1246372 A1 | 7/1986 |
| WO | 92/04776 A1 | 3/1992 |
| WO | 99/00645 A1 | 1/1999 |
| WO | 01/61280 A1 | 8/2001 |
| WO | 2011/064317 A2 | 6/2011 |

\* cited by examiner

METHOD FOR DETERMINING ABSOLUTE CODING OF AN OPTICAL CODING TRACK

FIELD OF THE INVENTION

The invention relates to a method for registering absolute coding of an optical code track.

BACKGROUND

An absolute encoder is a sensor for determining absolute positions of an object. The location of sensor and object in relation to one another is changeable. The sensor can register linear changes in location of the object and it can register rotating angular changes of the object. Sensors operating on contactless principles which determine the position of the object according to the optical or magnetic active principle are known. To this end, a sensor registers absolute coding of a code track and an evaluation unit evaluates the registered absolute coding and establishes the object position therefrom. Within the meaning of the invention, the absolute coding is a spatially resolved position specification.

Absolute encoders are used in multifaceted ways. In plant construction and engineering, they determine the positions of machine elements such as drives, swivel heads, rotary tables, etc. in relation to a reference system. In geodetic instruments such as theodolites, tachymeters, laser scanners, etc., they measure horizontal angles and vertical angles in relation to distant objects. In coordinate measuring machines, they register spatial alignments of robot arms, steering wheels, etc.

Figure 1:
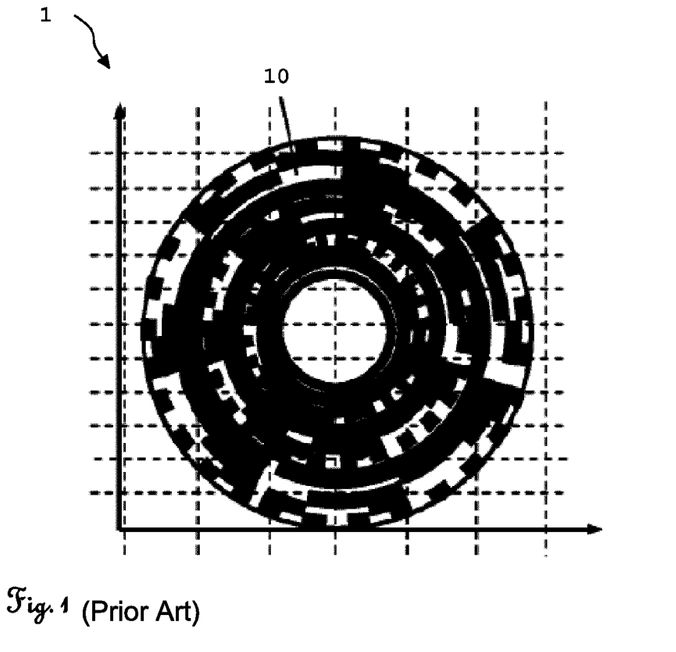
FIG. 1 shows an example of an optical code track from the prior art.

In the following, the special case of an optical code track is considered. An optical code track has a mechanical support in the form of a disk, a ribbon, etc. In this respect, FIG. 1 shows an example from the prior art according to EP1890113A1. Many adjacent code elements are arranged on the mechanical support of the optical code track, which code elements embody the absolute coding 10. Within the meaning of the invention, the code elements arranged in the track direction update the bijective position specification of the absolute coding from one code element to the next adjacent code element in a spatially resolved manner.

As a result of the presence of defined code elements, which respectively embody a discrete defined element of the code (and are then also considered code element by code element during the evaluation, wherein a state/value is established for each code element), it is possible to speak of a "digital" code here (in contrast to a continuous code, e.g. updated between 0 and 1, wherein any arbitrary intermediate value can be decoded into the respectively sought-after value such as the sought-after location specification on the basis of a defined conversion function; in this case, this is usually referred to as an "analog" code).

The code elements are e.g. light-transmissive rectangles which are arranged in an optically opaque residual region. The optical code track 1 is illuminated by light from a light source by way of the transmitted light principle. The code elements modulate the light. Light passed by the light-transmissive rectangles is registered by a sensor along the track direction; light not passed by the optically opaque residual regions is not registered by the sensor. The light-transmissive rectangles are imaged on the sensor as a cast shadow. The sensor generates state signals for registered light. In the case of relative motion of the optical code track and sensor, the sensor registers the absolute coding as a temporally discrete sequence of discontinuous bright/dark transitions.

The absolute coding has either a bijective position specification or a bijective code. Hence, the position specification is either established directly from the state signals or a position specification is assigned to the code of the state signal by way of look up in a table. Since the code elements and the sensor have a spatial extent, it is moreover possible to establish a centroid of the state signal in order to relate the established position specification to the centroid of the code element with sub-code element accuracy. Within the meaning of the invention, the width of the state signal in the track direction is referred to as signal width and the width of the sensor in the track direction is referred to as sensor width. A centroid of the code element is deduced from the centroid of the state signal. Moreover, the distance to a reference position in the track direction is determined from the centroid of the code element. Hence the state signal not only supplies a bijective position specification but also enables determination of the location of the code element in relation to a reference position.

However, as an alternative to determining the centroid, a person skilled in the art is also aware of different processes by means of which the precise position of the code element can be established on the basis of the registered code projection.

This is all carried out in order to determine the position of the object with high accuracy. Thus, positions of machine elements are determined with an accuracy of 1 µm and theodolites measure horizontal angles and vertical angles to objects at a distance of several hundred meters with an accuracy of 0.1 mgon. In order to be able to achieve such a high accuracy, systematic and non-systematic errors must be eliminated when determining the position of the object.

Highly accurate absolute encoders therefore comprise a plurality of sensors which are arranged with a fixed spatial relationship to one another and which redundantly register the absolute coding of the code track. By forming averages of the absolute coding registered redundantly it is possible to eliminate non-systematic errors when determining the position of the object.

The remaining systematic errors when determining the position of the object often have a harmonic nature. Such harmonic errors have multifaceted causes. Thus, they can be due to irregularly arranged code elements on the code track or be caused by thermal expansion of the code track, eccentricity of the mechanical support of the code track, mounting play of the absolute encoder, diffraction phenomena on code elements, etc. Moreover, the fixed spatial relationship between the sensors themselves and the regular arrangement of the code elements on the code track constitute periodic structures. The superposition of the periodic structures may form interfering moiré patterns in the case of optical absolute encoders. Moreover, according to the Nyquist-Shannon sampling theorem, information losses may occur when registering the absolute coding in the case where a selected sampling frequency of the absolute encoder is too small in relation to the maximum frequency of the code elements.

In this respect, WO2011/064317A1 describes a method for establishing error coefficients and a method for correcting the measured value of an absolute encoder using these error coefficients. The absolute encoder has at least two sensors and an optical code track. The sensors and the optical code track are movable relative to one another. The sensors register the absolute coding of the optical code track as a sequence of bright/dark transitions at different angular positions. The sensors are spaced apart from one another at an angle of at least 50 degrees. An evaluation unit establishes angle position values from the absolute coding registered by the sensors. By comparing the difference in angle position values of the sensors for a plurality of different angular positions, harmonic angular errors are represented as error coefficients in a Fourier series expansion. The angle position values are corrected by these harmonic angle errors.

SUMMARY

Some embodiments of the invention include providing an improved method for registering the absolute coding of an optical code track.

Some embodiments of the invention include providing an optical code track and an absolute encoder for registering the absolute coding of the optical code track, which require as few sensors and/or as little computational outlay as possible in order to determine the object in a highly precise way.

Some embodiments of the invention include providing a method for producing an optical code track, which method is compatible with existing and proven coating techniques in a cost-effective manner.

Some embodiments of the invention include providing an optical code track and an absolute encoder for registering the absolute coding of the optical code track, which have a high availability, even under rough usage conditions.

One aspect of the invention relates to a method for registering absolute coding, wherein the absolute coding is embodied by code elements of an optical code track and the individual code elements respectively form a main point or centroid, comprising illumination of the code elements with light; comprising modulation of part of the illuminating light at code elements; and comprising registration of the absolute coding as modulated light (i.e., modulated light is registered and state signals generated therefrom, for which state signals respectively one main point or centroid and the positions thereof are established). According to the invention, the modulation of the light at adjacent code elements in the direction of extent of the code track is effected in this case in a continuously varying manner.

Now, diffraction phenomena, which can lead to aliasing effects, may occur when modulating light on an optical code track from the prior art according to EP1890113A1 with rectangular code elements. These aliasing phenomena lead to quasi-stochastic errors when registering the modulated light. The quasi-stochastic errors also have an effect on the state signals which are generated for registered modulated light, and interfere with determination of the centroid of the state signals. The applicant discovered that such diffraction phenomena occur to reduced extent when registering light that is modulated at adjacent code elements with continuous variation. Adjacent code elements are a first and a second code element, which code elements adjoin one another and update the absolute coding from the first code element to the second code element in the track direction. The term "continuous" is always used in the mathematical sense; the updating of the absolute coding is brought about in a jump-less variation in the illuminating light.

Therefore, the invention relates to a digital absolute code, wherein the code track embodying the absolute coding is made up of defined code elements which respectively embody a discrete defined element of the code (and are then also considered code element by code element during the evaluation, wherein a state/value is established precisely for each code element).

By avoiding discontinuous bright/dark transitions, as occur at rectangular code elements of a digital code known from the prior art, diffraction phenomena are reduced, and so generated state signals also have fewer quasi-stochastic errors. Thus, according to the invention, there is a reduction in errors. Whereas harmonic errors in the prior art according to WO2011/064317A1 are expanded as error coefficients when registering a sequence of bright/dark transitions, and angle position values are subsequently corrected by these harmonic errors, the invention proceeds from the generation of the quasi-stochastic errors and reduces the sources or occurrence thereof.

A further aspect of the invention relates to an optical code track embodying digital absolute coding; said optical code track comprises a mechanical support, preferably in the form of a disk or a ribbon; and said mechanical support, at least in regions, comprises code elements which respectively form a defined main point or centroid. Here, the code elements are once again embodied in such a way that adjacent code elements modulate illuminating light in the direction of extent of the code track in a continuously varying manner.

In a special embodiment, the absolute coding is embodied as an aperture stop with, in the direction of extent of the code track, continuous variation of code heights (i.e. with continuously varying stop opening sizes along the direction of extent of the code track).

It was discovered that an aperture stop can embody absolute coding with code elements that have continuously varying code heights. The aperture stop consists of individual code elements which are arranged in the track direction and have different widths.

Alternatively, the absolute coding can also be embodied as a point grid with continuous variation of point densities of adjacent code elements.

It was also discovered that a point grid can embody absolute coding with code elements that have continuously varying point densities. The point grid consists of a grid with a changeable density, in the track direction, of dark points on a bright background.

In accordance with a further special embodiment, the absolute coding is embodied as a polarizer with continuous variation of polarization efficiencies of adjacent code elements.

Moreover, it was discovered that a polarizer can embody absolute coding. A polarizer is an optical means which modifies a polarization state of light with a specific polarization efficiency. Here, a distinction is made between a polarization due to scattering, a polarization due to reflection, a polarization due to absorption and a polarization due to birefringence.

Another further aspect of the invention relates to a system for registering the absolute coding of the optical code track; which system comprises an absolute encoder with an optical sensor; which absolute encoder generates at least one state signal for registered modulated light; which state signal has a signal width, which signal width is less than a sensor width of the sensor.

It is known that the centroid of the state signal can only be established with minimum error if the signal width of the state signal is precisely an integer multiple of the sensor element width (i.e. of the pixel spacing) of the sensor. As soon as the signal width deviates therefrom, the centroid of the state signal can only be established with a larger or smaller error. The error is at maximum when the signal width of the state signal deviates from the integer multiple of the sensor element width by half a sensor element width. Now, from a practical and technical point of view, it is impossible to generate a signal width which is exactly a multiple of the sensor element width under all usage conditions. Thus, the signal width is influenced by varying factors such as the imaging scale, the surrounding temperature, production tolerances of the optical code track and absolute encoder, etc. The code element can be imaged on the sensor using a lens optical unit; each lens optical unit is afflicted by a distortion which images the code element with a different width onto the sensor depending on the location, the sensor generating a state signal for said image.

Another further aspect of the invention relates to a method for producing the optical code track, in which a mechanical support of the optical code track is provided; on which mechanical support a coating is applied, at least in regions; and into which coating code elements are structured, which code elements respectively form a main point or centroid and modulate illuminating light; the code elements are structured in such a way that illuminating light is modulated with a continuous variation at adjacent code elements.

Such a production method is cost-effective and compatible with existing and proven techniques.

BRIEF DESCRIPTION OF THE DRAWINGS

Further advantages and features of the invention can, in conjunction with the attached figures, be gathered in an exemplary manner from the following description of currently preferred embodiments.

DETAILED DESCRIPTION

Figure 2:
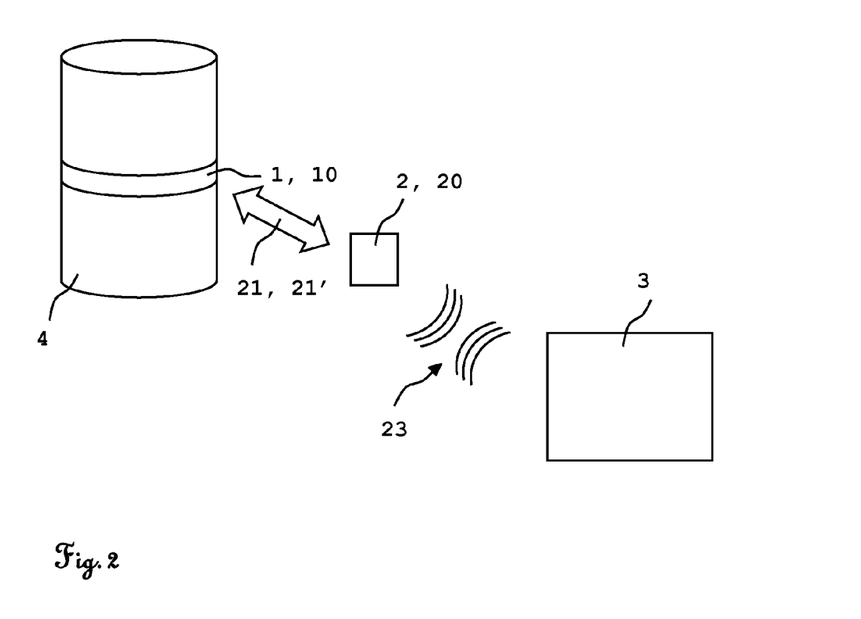
FIG. 2 schematically shows an absolute encoder which registers an optical code track according to the invention with a sensor and communicates a state signal to an evaluation unit.

FIG. 2 shows an absolute encoder 2 which registers an absolute coding 10 of an optical code track 1 using an optical sensor 20. The optical code track 1 is fixedly arranged on an object 4. Both the optical code track 1 and the object 4 may have any size, shape and form. By way of example, the optical code track 1 has the form of a disk, a ribbon, etc. By registering the absolute coding 10, it is possible to determine an object position absolutely. In accordance with FIG. 2, the object 4 is schematically embodied as a cylinder and the optical code track 1 is arranged externally on the circumference of the object 4 in the form of a ribbon and completely surrounds the circumference. The absolute encoder 2 communicates with an evaluation unit 3. The position between the absolute encoder 2 and the optical code track 1 is variable.

The absolute encoder 2 has a light source, said light source generating light 21, said light 21 illuminating the optical code track 1. The light 21 consists of electromagnetic waves such as radio waves, microwaves, visible light, etc. Light 21' modulated at code elements 100, 100' of the optical code track 1 is registered by the optical sensor 20. Within the meaning of the invention, the phrase "modulation of light" is understood to mean a physical interaction between light 21 and code elements 100, 100' of the optical code track 1. Modulation of light comprises scattering of light, reflection of light, refraction of light, diffraction of light, absorption of light, polarization of light, etc. By way of example, the optical sensor 20 is a collection of sensor elements, such as a charge coupled device (CCD), a complementary metal oxide semiconductor (CMOS), etc. Here, the sensor has individual photoreception elements aligned next to one another, wherein the sensor width in the X-direction (and, optionally, in the Y-direction as well for a two-dimensional array) is specified in a number of individual photoreception elements (pixels). The X-direction is the sensor track direction. By way of example, in accordance with FIGS. 12 to 22, the optical sensor 20 is a line array with 1000 photoreception elements (pixel) in the X-direction. According to the invention, individual reception elements of the sensor are in this case not only illuminated either "not at all or completely", but many different intermediate values (grayscale values) are generated for the illumination of the individual reception elements (pixels) as a result of the continuously varying modulation for the code projection generation, wherein the illuminance over the course of the individual pixels along the sensor line then corresponds to the continuously varying modulation within the scope of the code projection.

The absolute encoder 2 generates as sensor output, dependent on the registered code projection, at least one state signal 200 for modulated light 21' registered by the optical sensor 20 and communicates this state signal 200 to the evaluation unit 3. Details in respect of the state signal 200 follow in FIGS. 12 to 24. The communication 23 of the state signal 200 can be effected in an arbitrary manner; in particular, it can be effected on the basis of cables, radio waves, etc. If a person skilled in the art knows of the present invention, he can embody the absolute encoder with an evaluation unit integrated in the housing as a single unit.

Figure 3:
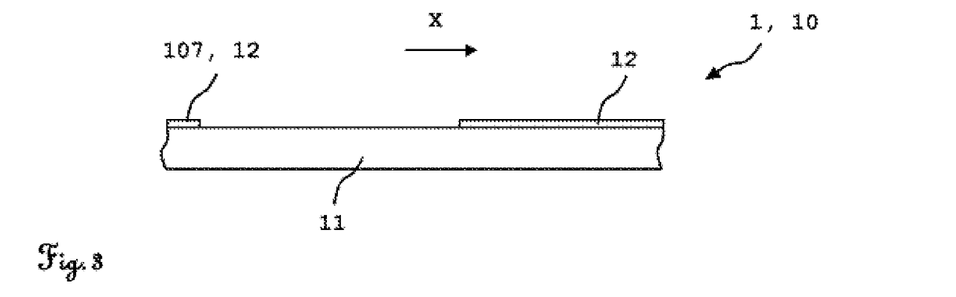
FIG. 3 shows a cross section of part of a first embodiment of an optical code track according to FIG. 2, with a constant thickness of the coating in the track direction.
Figure 4:
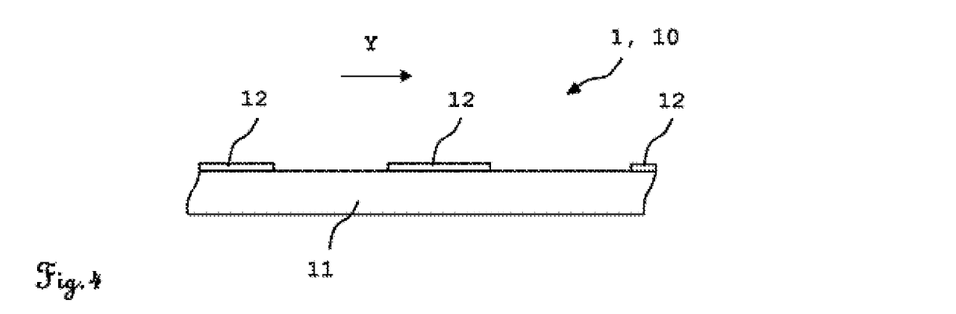
FIG. 4 shows a cross section of part of the first embodiment of an optical code track according to FIG. 3, with a constant thickness of the coating obliquely to the track direction.
Figure 5:
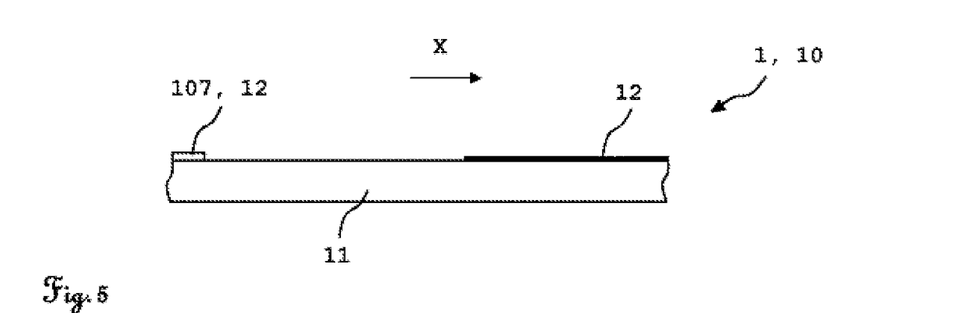
FIG. 5 shows a cross section of part of a second embodiment of an optical code track according to FIG. 2, with a varying thickness of the coating in the track direction.
Figure 6:
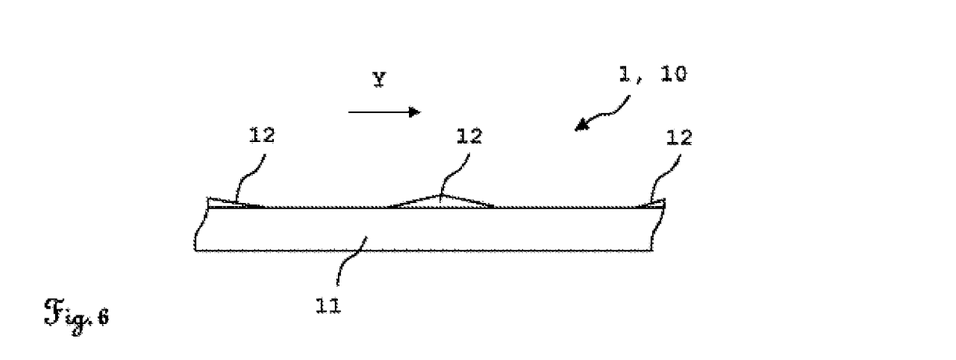
FIG. 6 shows a cross section of part of the second embodiment of an optical code track according to FIG. 2, with a varying thickness of the coating obliquely to the track direction.
Figure 7:
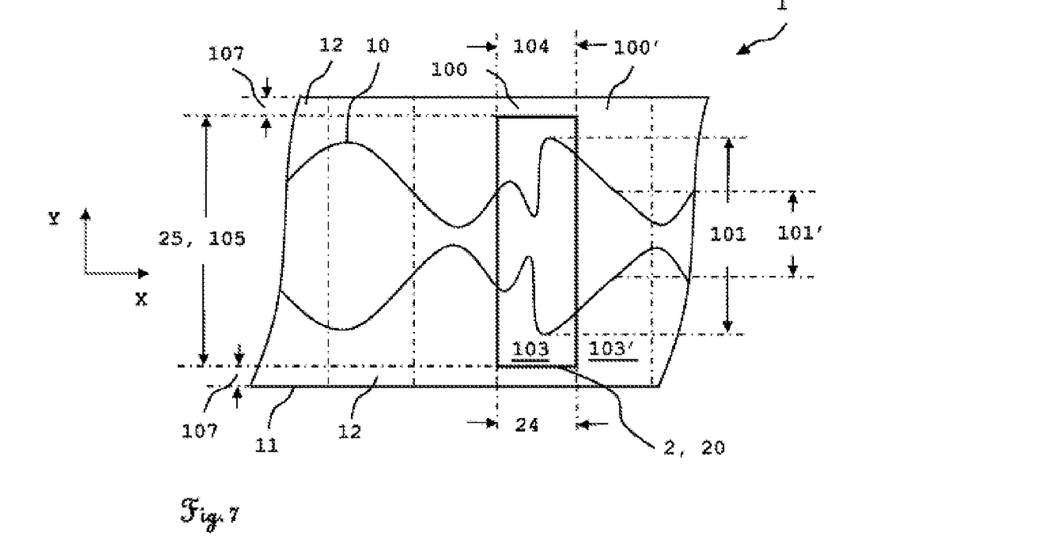
FIG. 7 shows a view of part of a third embodiment of an optical code track according to FIG. 2, with an aperture stop as absolute coding.

FIGS. 3 to 11 show a plurality of embodiments of an optical code track 1, wherein a digital absolute code is embodied in each case. By way of example, the optical code track 1 comprises a mechanical support 11 made of glass, plastic, metal, etc. FIGS. 3 to 6 show the optical code track 1 in a cross section along the track direction (X-direction) and in a cross section in the Y-direction across the track direction. By way of example, a coating 12, made of chromium, silicon nitride and molybdenum, etc., is applied to the mechanical support 11, at least in regions. FIGS. 7 to 11 show a view of the optical code track 1. By way of example, photolithographic, etched or electroplated code elements 100, 100' are structured in the coating 12, at least in regions. The regions of the mechanical support 11 uncovered after structuring, which no longer comprise a coating 12, may be e.g. more than 90%, in particular more than 98%, light-transmissive for the light 21. The regions of the mechanical support 11 covered after structuring, which still have a coating 12, are e.g. more than 90%, in particular more than 98%, optically opaque, i.e. do not transmit light, for the light 21. As shown in FIGS. 3 and 4, the thickness of the coating 12 of the optical code track 1 may, in regions, be constant in the X-direction and in the Y-direction. By way of example, the coating has a thickness of 1 μm, preferably a thickness of 0.5 μm, preferably 0.1 μm, etc., in both an edge region 107 and in a central region. As shown in FIGS. 5 and 6, the thickness of the coating 12 may, however, also be different for various regions of the optical code track 1. By way of example, in accordance with FIG. 5, in the X-direction, the coating 12 is thicker in the edge region 107, where it is 0.6 μm thick, than in central regions, where it is 0.2 μm thick. Moreover, in accordance with FIG. 6, the thickness of the coating 12 may vary continuously between 0.1 μm and 1.0 μm in the Y-direction.

The light 21' modulated at the code elements 100, 100' is registered by transmitted light or reflected light. In the transmitted light method, the optical sensor 20 registers the light 21' modulated by uncovered regions; in the reflected light method, the optical sensor 20 registers the light 21' modulated at covered regions. In the case of the optical code track 1 in the embodiment in accordance with FIGS. 7, 9, 10 and 11, modulated light 21' is, in an exemplary manner, registered using the transmitted light method (wherein this—as is known to a person skilled in the art per se—can alternatively also be effected by the reflected light method). In the optical code track 1 in the embodiment as per FIG. 8, modulated light 21' is, in an exemplary manner, registered using the reflected light method (wherein, alternatively, the transmitted light method can also be used here in turn—as is known to a person skilled in the art per se).

The optical sensor 20 registers the absolute coding 10 by changing the mutual position along the X-direction. The code elements 100, 100' embodying the absolute coding 10 can have a constant code element width 104 in the X-direction and they have a constant maximum code element height 105 in the Y-direction. The sizes of the code element width 104 and the maximum code element height 105 lie in the range of a few micrometers to a few centimeters. Adjacent code elements 100, 100' adjoin one another. In the Y-direction, the code elements 100, 100' are arranged with the edge spacing 107 from an edge of the optical code track 1. The size of the edge spacing 107 is constant and lies in the range of a few micrometers to a few millimeters. The dimensions of the optical sensor 20 (or of the spacing of the individual pixels of the sensor) and of the code elements 100, 100' are matched to one another. A sensor width 24 of the optical sensor 20 along the X-direction is greater than two code element widths 104 of the code elements 100, 100' such that the code projection generated on the sensor in each case contains a representation of in each case at least one whole code element 100, 100' (optionally, the code element width can be selected in such a way in relation to the sensor line length (i.e. in relation to the sensor width) that the code projection contains many pulses which are generated by many code elements 100, 100'). A sensor height 25 of the optical sensor 20 (in the Y-direction, i.e., in other words, the extent in the direction transverse to the direction of extent of the sensor line) may in this case be selected to be greater than the maximum code element height 105 of the code elements 100, 100'.

Figure 9:
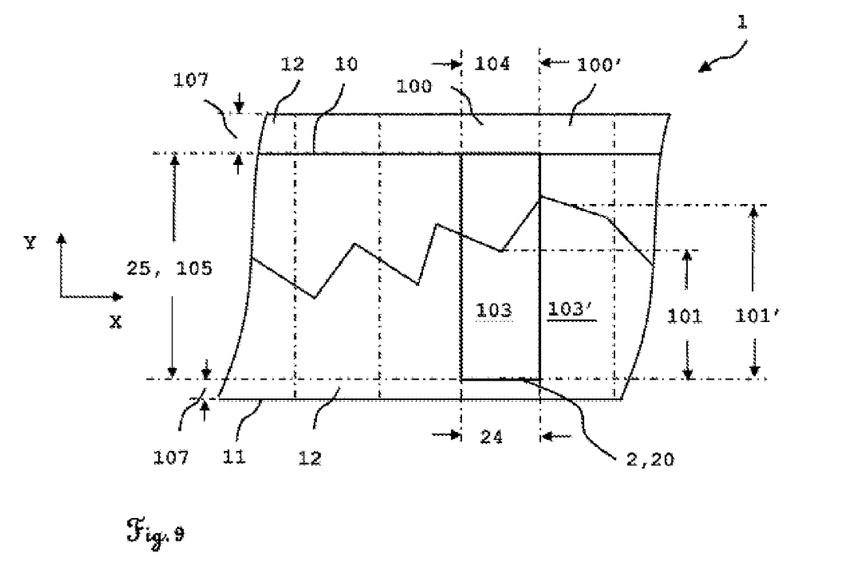
FIG. 9 shows a view of part of a fifth embodiment of an optical code track according to FIG. 2, with an aperture stop as absolute coding.
Figure 10:
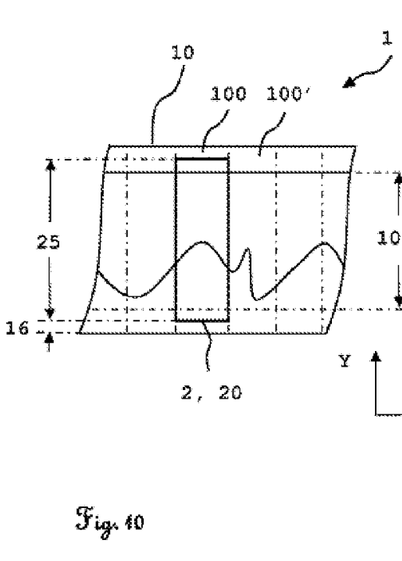
FIG. 10 shows a view of part of a sixth embodiment of an optical code track according to FIG. 2, with an aperture stop as absolute coding, during the process of registering light modulated at a first code element.
Figure 11:
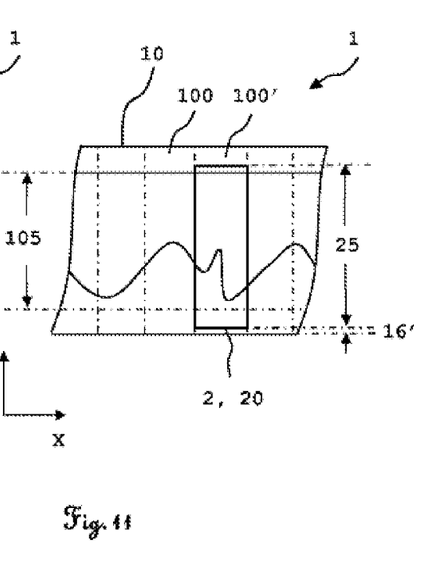
FIG. 11 shows a view of part of the optical code track according to FIG. 10 during the process of registering light modulated at a first code element.

FIGS. 7, 9, 10 and 11 show various embodiments of an optical code track 1 with an aperture stop as absolute coding 10. While the aperture stop in FIG. 7 has a continuously varying aperture stop opening on both sides, FIGS. 9, 10 and 11 show aperture stop openings varying on one side. Thus, the coating 12 is structured in such a way that it forms an aperture stop. Here, the mechanical support 11 in the edge region 107 of the code elements 100, 100' is completely covered by the coating 12; here, an aperture stop opening is formed in the central region of the code elements 100, 100' which, in terms of their opening size (i.e. the height of the opening measured across the direction of extent of the code track in the shown figure) varies without jumps, i.e. continuously, in the direction of extent of the code track. Here, the mechanical support 11 is thus only covered by the coating 12 in regions. In accordance with FIGS. 7, 9, 10 and 11, each code element 100, 100' has a single contiguous region uncovered by the coating 12. Code heights 101, 101' of adjacent code elements 100, 100' vary continuously, i.e. without jumps, in the direction of extent of the code track. As a result of the continuous variation in the code heights 101, 101', illuminating light 21 is modulated with a continuous variation. The code height 101, 101' is the extent of the coating 12 of a code element 100, 100' in the Y-direction, as measured from the edge region 107. The code height 101, 101' therefore specifies the boundary of the coating 12 on the mechanical support 11. In accordance with FIGS. 7, 10 and 11, the aperture stop has a boundary of the coating 12 in the form of curved aperture stop sections; in accordance with FIG. 9, the aperture stop has a boundary of the coating 12 in the form of straight-lined jagged sections.

Figure 8:
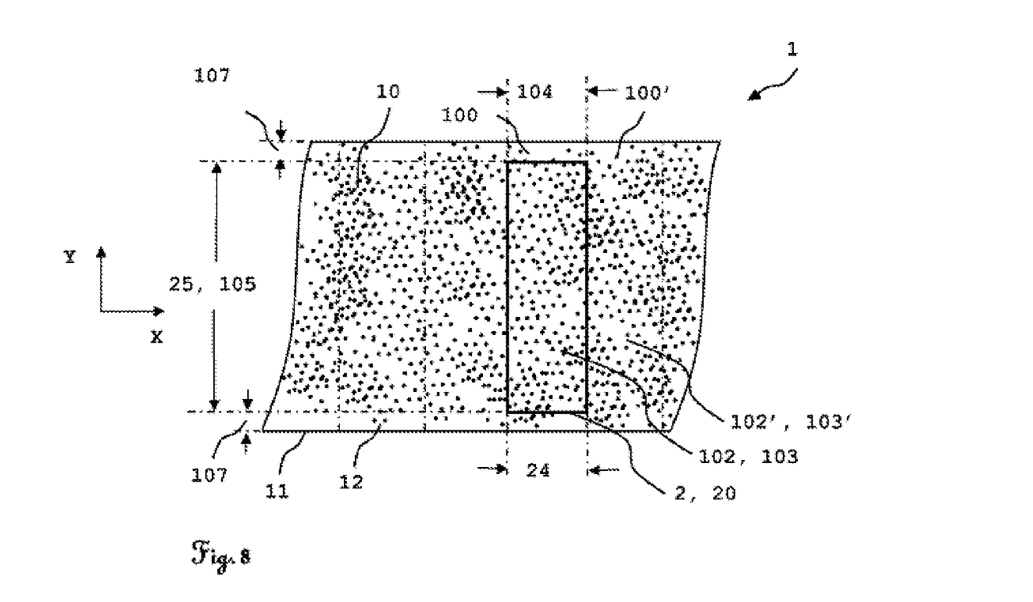
FIG. 8 shows a view of part of a fourth embodiment of an optical code track according to FIG. 2, with a point grid as absolute coding.

FIG. 8 shows an embodiment of an optical code track 1 comprising a point grid as absolute coding 10. The point density 102, 102' of adjacent code elements 100, 100' varies continuously. The mechanical support 11 is, both in the edge region 107 of the code elements 100, 100' and in the central region of the code elements 100, 100', only covered with a coating 12 in the form of points in regions. The region uncovered by the coating 12 may be contiguous, but it may also be non-contiguous. The point densities 102, 102' of adjacent code elements 100, 100' vary continuously. As a result of the continuous variation in the point densities 102, 102', illuminating light 21 is modulated with a continuous variation. The point density 102, 102' is the density of points measured per unit of area in the XY-coordinate system. The size of the points, such as 10 µm, 5 µm etc., may be constant for the whole optical code track 1; however, the size of the points may also be different for various regions of the optical code track 1, such as 5 µm in a first region, 6 µm in a second region, etc.

The embodiments of an optical code track 1 in accordance with FIGS. 3 to 11 can also be realized using a polarizer as absolute coding 10, which polarizer modifies a polarization state of the light 21 with a specific polarization efficiency 103, 103' such that the polarization efficiency 103, 103' of adjacent code elements 100, 100' varies continuously. As a result of the continuous variation of the polarization efficiency 103, 103', illuminating light 21 is modulated with a continuous variation. Here, a distinction is made between polarization by scattering, polarization by reflection, polarization by absorption and polarization by birefringence. Polarization by scattering, absorption and birefringence can be realized with the embodiments in accordance with FIGS. 7, 9, 10 and 11. Polarization by reflection can be realized with the embodiment in accordance with FIG. 8. In accordance with FIGS. 7, 9, 10 and 11, the polarization efficiency 103, 103' is a specific function of the code height 101, 101'; in accordance with FIG. 8, the polarization efficiency 103, 103' is a specific function of the point density 102, 102'. Moreover, the polarization efficiency 103, 103' can also be varied over the thickness of the coating 12, the type of materials of the coating 12 and of the mechanical support 11, etc.

FIGS. 10 and 11 show an exemplary registration of the absolute coding 10 at two adjacent code elements 100, 100'. In accordance with FIG. 10, the optical sensor 20 registers modulated light 21' from a first code element 100 and, in accordance with FIG. 11, the optical sensor 20 registers modulated light 21' from a second code element 100'. By way of example, the optical code track 1 comprises a mechanical support 11 in the form of a disk, which disk has an eccentricity 16, 16' in the Y-direction caused by the production process. The eccentricity 16, 16' is expressed by virtue of a lower edge of the optical code track 1 in accordance with FIG. 10 being further away from the optical sensor 20 than in accordance with FIG. 11; accordingly, the eccentricity 16 in the first code element 100 is greater than the eccentricity 16' in the second code element 100'. The optical sensor 20 has a sensor height 25 along the Y-direction which is greater than the code element height 105 of the code elements 100, 100' in order thus to compensate eccentricities 16, 16' of the optical code track 1 in respect of the Y-direction and to avoid code elements 100, 100' being registered in an incomplete manner.

Figure 22:
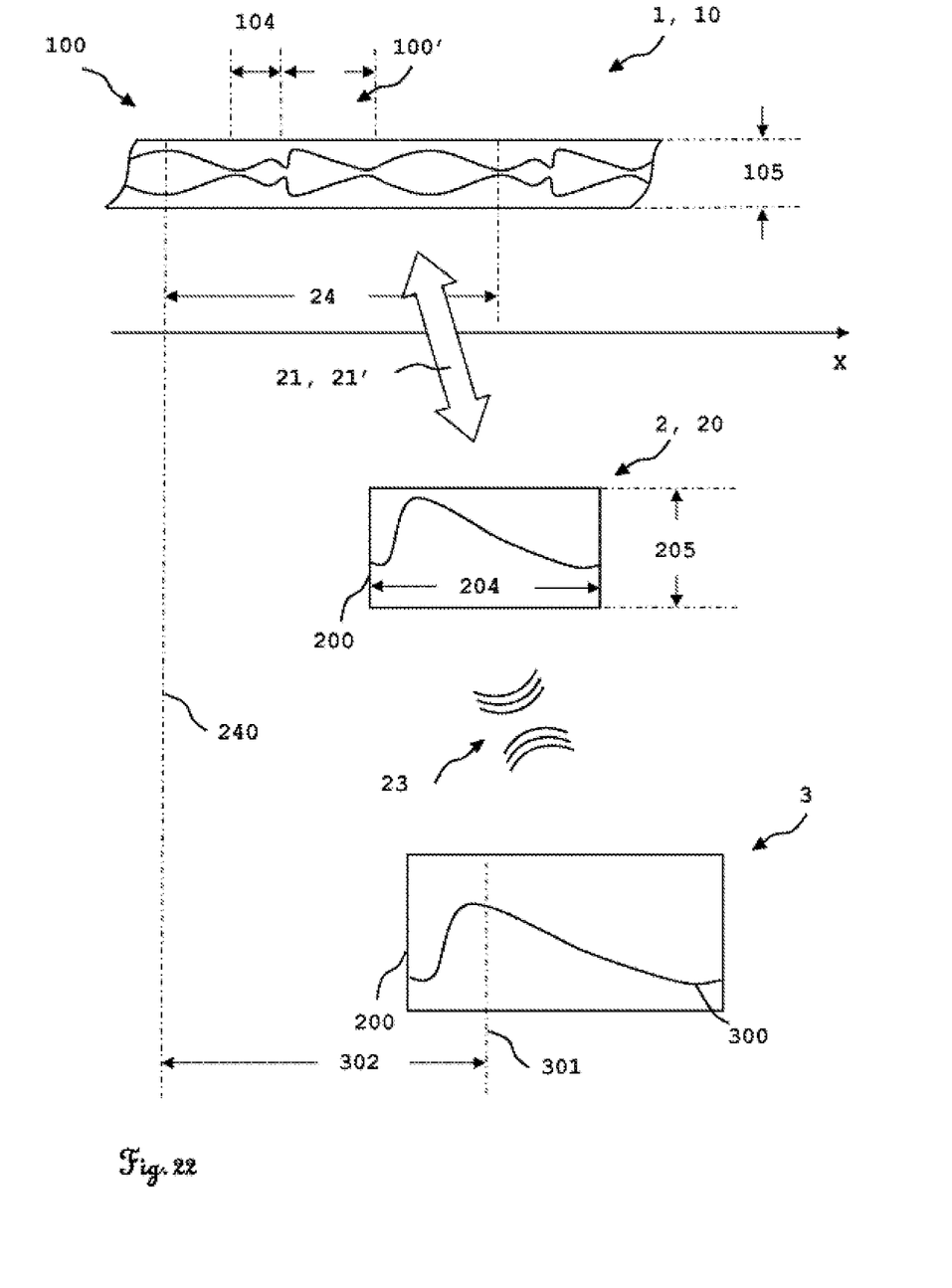
FIG. 22 schematically shows the registration of light modulated at code elements of the absolute coding according to FIG. 2 by means of an absolute encoder according to FIG. 2 and the determination of an object position by the evaluation unit according to FIG. 2.

For the purposes of precise alignment of the code elements 100, 100' in relation to the sensor 20, it is possible to establish, for each state signal 200, a position (e.g. in the form of a defined main point or of a centroid 301 of the state signal 200). A distance 302 of a code element 100 from a reference position 240 of the sensor 20 is determined with the aid of the position (e.g. of the main point or centroid 301). Details in this respect are depicted in FIG. 22. Here, the form of the code elements 100, 100' and of the sensor 20 influence the accuracy when determining the centroids 301 of the state signals 200. FIGS. 12 to 23 show how an error F when determining the positions of the state signals 200 depends on the signal width 204 of the state signals 200 and on the pixel spacing of the individual registration elements of the sensor 20. FIGS. 12, 14, 16, 18, 20 and 22 show the state signals 200 and FIGS. 13, 15, 17, 19, 21 and 23 show the error F. The ordinate in FIGS. 12, 14, 16, 18, 20 and 22 is a signal strength S normalized to one, which signal strength is emitted by the individual registration elements (pixels) of the sensor registering the code projection; the abscissa in FIGS. 12, 14, 16, 18, 20 and 22 is the X-direction (i.e. the direction of extent) of the sensor. By way of example, the sensor 20 consists of a line array with 1000 sensor elements arranged next to one another in the X-direction. All 1000 sensor elements form the sensor width 24. The ordinate in FIGS. 13, 15, 17, 19, 21 and 23 is the error F; the abscissa in FIGS. 13, 15, 17, 19, 21 and 23 is the X-direction. The error F when determining the centroids 301 of the state signals 200 depends to a greater or lesser extent on a centroid shift V. The centroid shift V is caused or simulated by quasi-stochastic errors.

Figure 12:
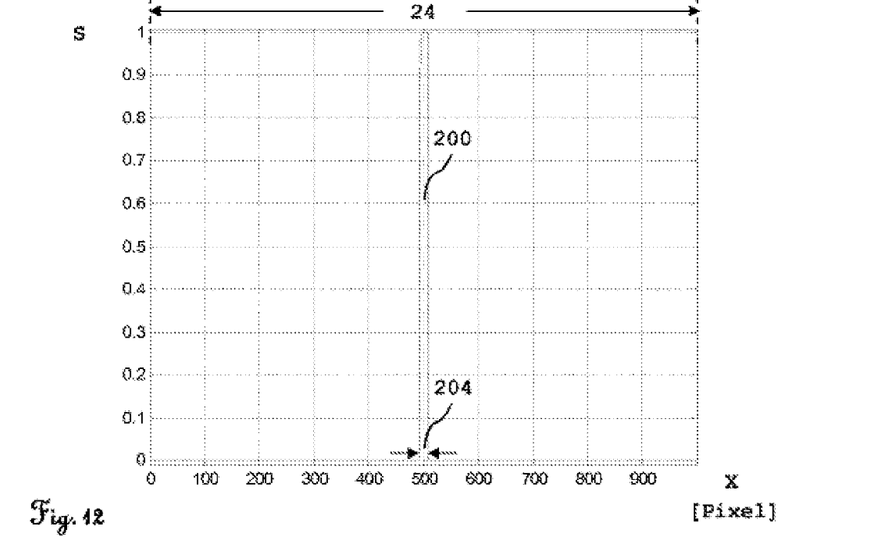
FIG. 12 shows a first embodiment of an individual rectangular state signal on the sensor of the absolute encoder according to FIG. 2.
Figure 13:
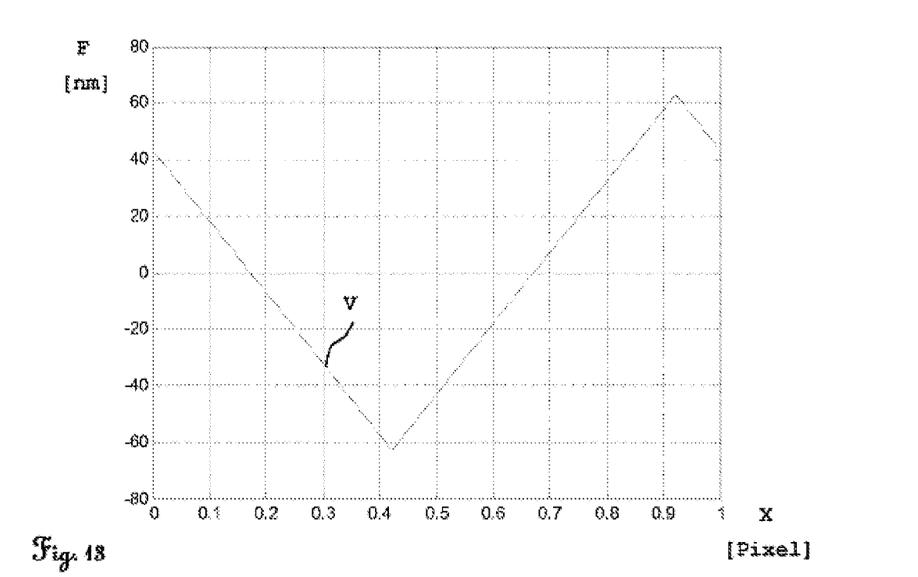
FIG. 13 shows the error when determining the centroid of the state signal according to FIG. 12.

FIG. 12 shows an individual rectangular state signal 200. A rectangular state signal 200 is generated for registered light which was modulated at rectangular code elements, as are known from the prior art. By way of example, the state signal 200 has a signal width 204 of fifteen and a half pixels. The signal width 204 is a non-integer multiple of the pixel spacing. FIG. 13 shows the error F for such a selection of signal width 204 in relation to the pixel spacing for registering a rectangular state signal. The centroid shift V occurs in the range from zero to a whole pixel. As a result of the state signal being rectangular and the signal width not forming an integer multiple of the pixel spacing, the error F has a sawtooth-like profile in the range from −60 nm to +60 nm; the standard deviation of the error F is 36 nm.

Figure 14:
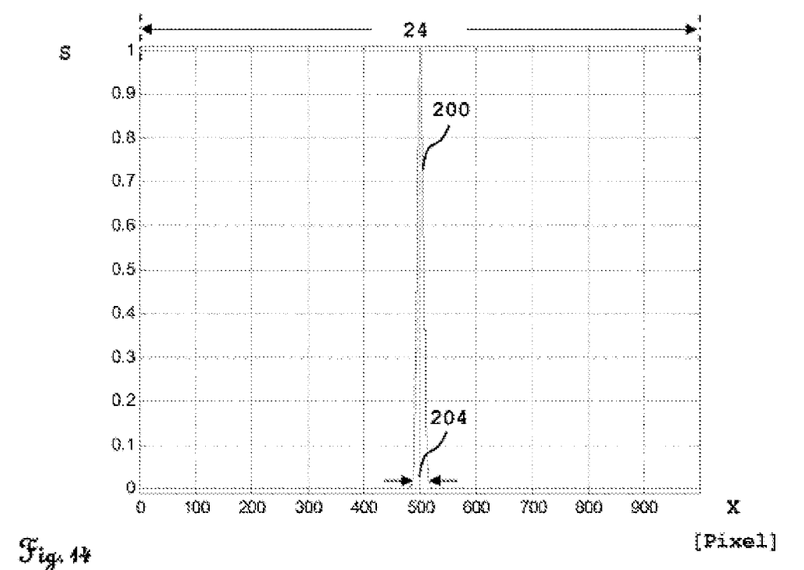
FIG. 14 shows a second embodiment of an individual bell-shaped state signal on the sensor of the absolute encoder according to FIG. 2.
Figure 15:
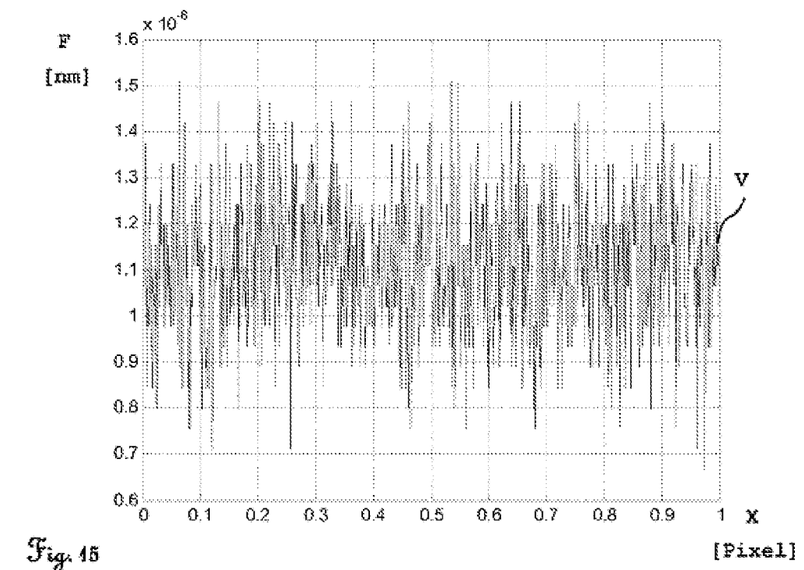
FIG. 15 shows the error when determining the centroid of the state signal according to FIG. 14.

FIG. 14 shows an individual bell-shaped state signal 200. A bell-shaped state signal 200 is generated for registered light 21' which was modulated at code elements 100, 100' according to the invention (i.e. modulated in a continuously varying manner), which continuous variation according to the invention leads to small diffraction phenomena and few quasi-stochastic errors in the state signal 200. The state signal 200 has a signal width 204 of e.g. fifteen and a half pixels. The signal width 204 is a non-integer multiple of the pixel spacing. FIG. 15 shows the error F for such a selection of signal widths 204 in nm in relation to the pixel spacing. The centroid shift V occurs in the range from zero to a whole pixel. As a result of the bell-shaped state signal, the error F is merely noise in the range from $0.7 \times 10^{-8}$ nm to $1.5 \times 10^{-8}$ nm; the standard deviation of the error F is $1.1 \times 10^{-8}$ nm.

Figure 16:
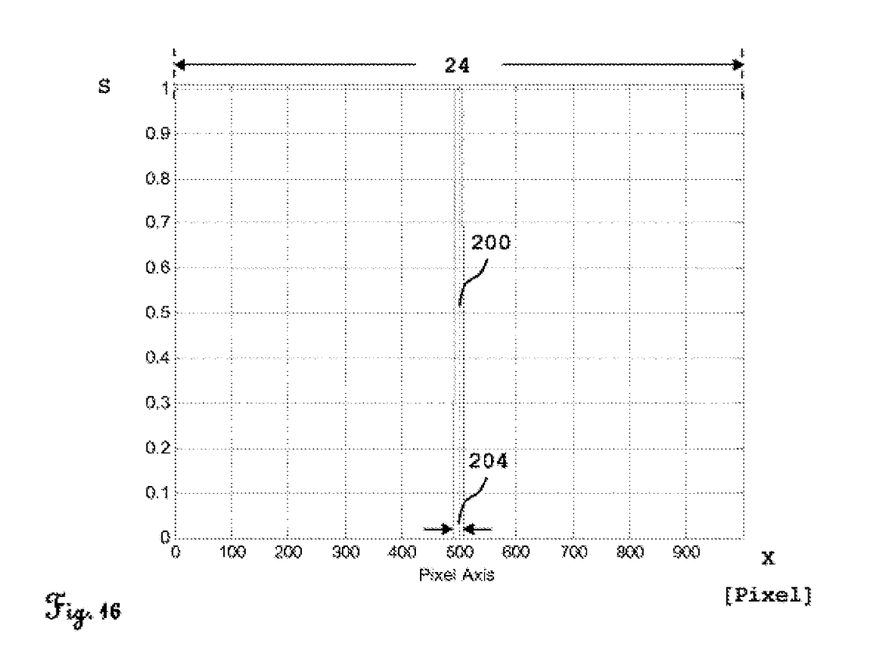
FIG. 16 shows a third embodiment of an individual rectangular state signal on the sensor of the absolute encoder according to FIG. 2.
Figure 17:
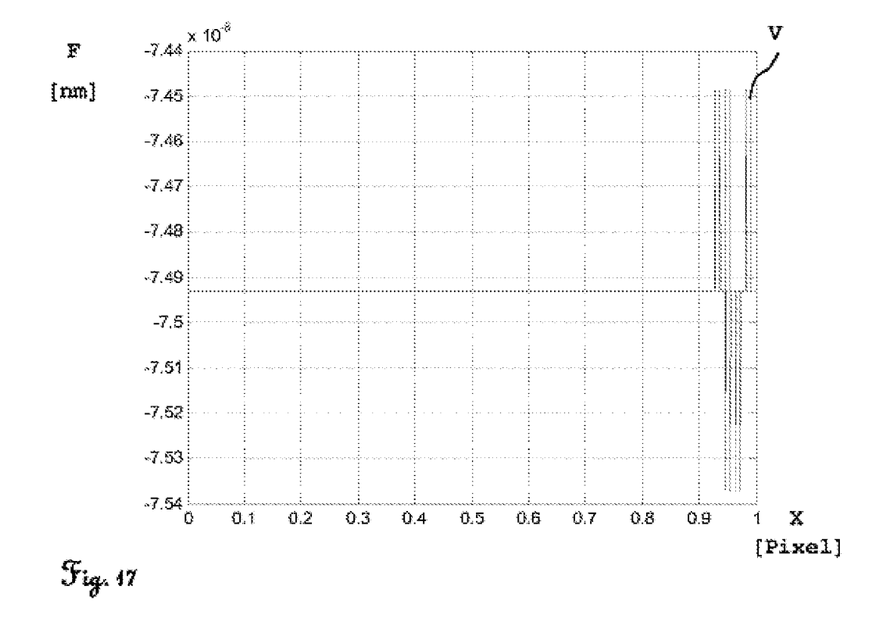
FIG. 17 shows the error when determining the centroid of the state signal according to FIG. 16.

FIG. 16 shows an individual rectangular state signal 200 with a signal width 204 of fifteen pixels. The signal width 204 is an integer multiple of the sensor elements. FIG. 17 shows the error F for such a ratio of signal width 204 to pixel spacing. The centroid shift V occurs in the range from zero to a whole pixel. The error F is noise and varies in the range from $-7.54 \times 10^{-8}$ nm to $-7.44 \times 10^{-8}$ nm; the standard deviation of the error F is $-7.49 \times 10^{-8}$ nm.

Figure 18:
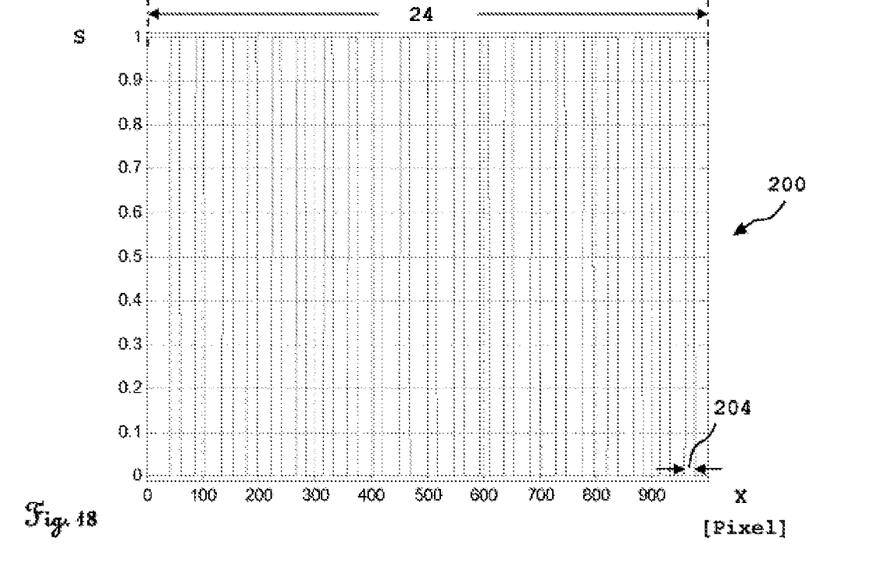
FIG. 18 shows a fourth embodiment of a multiple rectangular state signal on the sensor of the absolute encoder according to FIG. 2.
Figure 19:
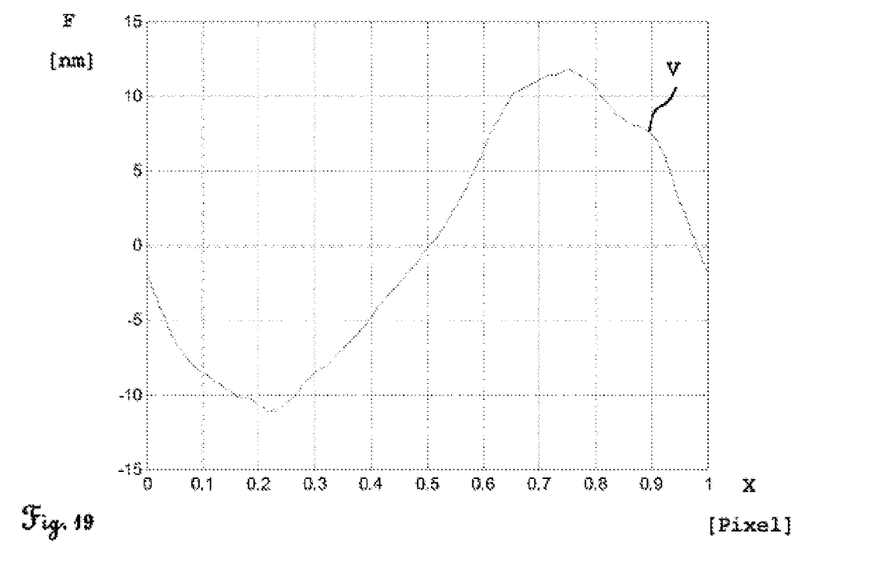
FIG. 19 shows the error when determining the centroid of the state signal according to FIG. 18.

FIG. 18 shows a multiple rectangular state signal 200 with different signal widths 204 in the range from fourteen and a half pixels to fifteen and a half pixels. The error F for such a ratio of signal width 204 to pixel spacing can be seen in FIG. 19. The centroid shift V in this case is also in the range from zero to a whole pixel. The centroid shift V shows a rounded-off sawtooth-like profile and varies in the range from −11 nm to +11 nm; the standard deviation of the error F is 7.9 nm.

Figure 20:
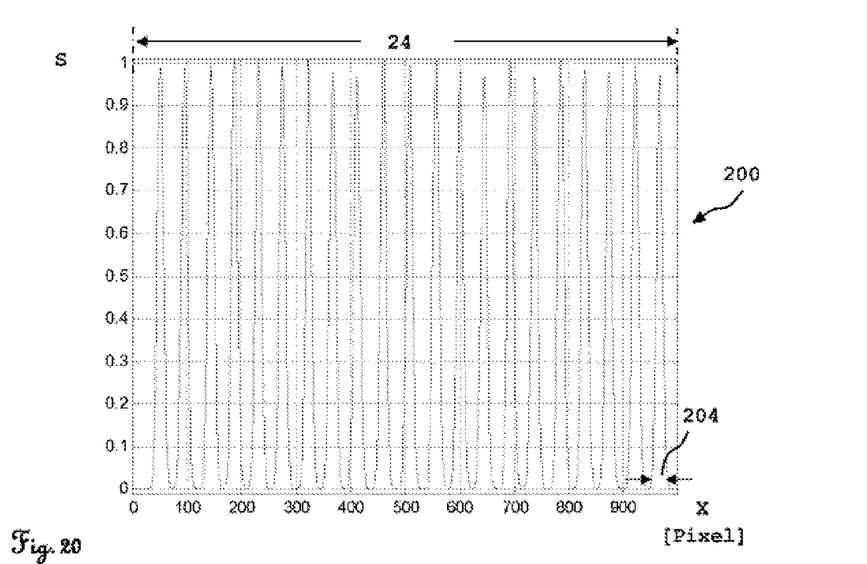
FIG. 20 shows a fifth embodiment of a multiple bell-shaped state signal on the sensor of the absolute encoder according to FIG. 2.
Figure 21:
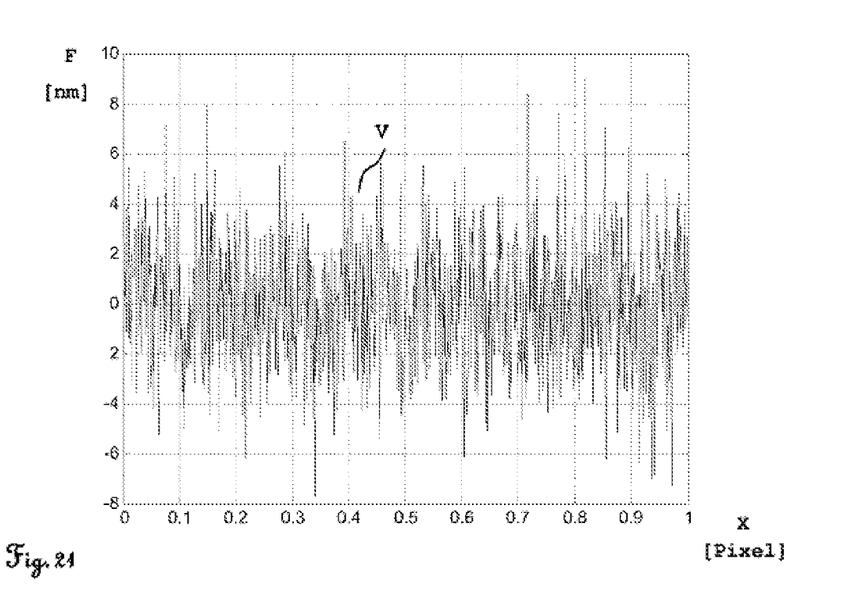
FIG. 21 shows the error when determining the centroid of the state signal according to FIG. 20.

FIG. 20 shows a multiple bell-shaped state signal 200, generated by the continuously varying modulation according to the invention, comprising different signal widths 204 in e.g. the range from fourteen and a half pixels to fifteen and a half pixels. The error F for such a configuration of the code (namely such that the signal width 204 has a varying width over the profile of the code in the code track direction and varies in an exemplary manner between fourteen and a half pixels and fifteen and a half pixels) can be seen in FIG. 21. The centroid shift V in this case is also in the range from zero to a whole pixel. The centroid shift V is noise and varies in the range from −7 nm to +9 nm; the standard deviation of the error F is 2.4 nm.

FIG. 22 shows the registration of light 21', modulated at a code element 100' of the optical code track 1, by the absolute encoder 2. The absolute encoder 2 generates a state signal 200 for registered modulated light 21'. Therefore, the code element 100' is imaged as a state signal 200 (that is to say as code projection) on a sensor 20 of the absolute encoder 2, and registered by the sensor 20. The state signal 200 is communicated to the evaluation unit 3. The evaluation unit 3 comprises a microprocessor and a computer-readable data storage medium. In order to evaluate the state signal 200, a computer program product is loaded into the microprocessor of the evaluation unit 3 from the computer-readable data storage medium (which either can be situated locally in the evaluation unit 3 or else can be situated externally and connected via the Internet) and executed. The evaluation unit 3 may be a stationary computer such as a personal computer (PC), a printed circuit board with a microcomputer with a programmable logic or, or a mobile computer such as a laptop, smartphone, etc. Thus, the program code according to the invention can be present within the scope of a computer program product, which is stored in a machine readable medium, or a computer data signal embodied by an electromagnetic wave, wherein the program code is suitable for establishing the object position from absolute coding 10 of the optical code track 1 registered by the above-described system according to the invention when the program is loaded into, and executed on, the microprocessor of the evaluation unit 3. The evaluation unit 3 establishes a position specification 300 in respect of the communicated state signal 200. The state signal 200 has either a bijective position specification or a bijective code. Hence, the position specification is either established directly from the state signal 200 or a position specification is assigned to the code of the state signal 200 by way of look up in a digital table. The digital table is likewise stored in the computer-readable data storage medium and loadable into the microprocessor of the evaluation unit 3. The evaluation unit 3 also determines a position (e.g. in the form of a centroid 301) of the communicated state signal 200 and determines a distance 302 between the centroid 301 and a reference position 240 of the absolute encoder 2. Therefore, the object position is determined absolutely from the sum of the position specification 300 and the distance 302.

It is understood that these depicted figures only schematically depict possible embodiments. The various approaches can likewise be combined with one another and with methods and instruments from the prior art.

What is claimed is:

1. A method for registering absolute coding, wherein the absolute coding is embodied by individual code elements of a code track and the individual code elements respectively form a main point or centroid, the method comprising:
    illuminating of the code elements with light;
    modulating of part of the illuminating light at code elements;
    registering of modulated light and generation of state signals, and
    establishing of a main point or centroid for the state signals and the positions thereof;
    wherein: the modulation of the light at adjacent code elements in the direction of extent of the code track is effected in a continuously varying manner.

2. The optical code track embodying absolute coding, for use in the method as claimed in claim 1, wherein:
    the optical code track comprises a mechanical support, and
    the mechanical support, at least in regions, comprises code elements, wherein the individual code elements respectively form a defined main point or centroid;
    wherein the code elements are embodied in such a way that adjacent code elements modulate illuminating light in the direction of extent of the code track in a continuously varying manner.

3. The optical code track as claimed in claim 2, wherein the mechanical support comprises either or both a disk or a ribbon.

4. The optical code track as claimed in claim 2, wherein:
    in that the absolute coding is embodied as an aperture stop with continuous variation of code heights of adjacent code elements.

5. The optical code track as claimed in claim 2, wherein:
    in that the absolute coding is embodied as a point grid with continuous variation of point densities of adjacent code elements.

6. The optical code track as claimed in claim 2, wherein:
    in that the absolute coding is embodied as a polarizer with continuous variation of polarization efficiencies of adjacent code elements.

7. The optical code track as claimed in claim 6, wherein:
    in that use is made of a polarizer which
    scatters light; or
    reflects light; or
    absorbs light; or
    is birefringent in the case of light.

8. The optical code track as claimed in claim 7, wherein the optical code track comprises a coating whereby:
    the coating, at least in regions, has a constant optical density; and/or
    the coating, at least in regions, has a varying optical density.

9. The optical code track as claimed in claim 8, wherein the coating, at least in regions, has a constant thickness.

10. The optical code track as claimed in claim 8, wherein the coating, at least in regions, has a varying thickness.

11. The optical code track as claimed in claim 2, wherein:
    in that the code elements have a constant code element width; and/or
    in that the code elements have a constant code element height.

12. A system for use in the method as claimed in claim 1, wherein:
    the system comprises an absolute encoder including an optical sensor and an optical code track;
    the sensor is embodied for registering the light modulated with continuous variation at adjacent code elements in the direction of extent of the code track; and in that—on the basis of an output signal generated by the sensor when registering the light—state signals and, for the state signals, respectively one main point or centroid and the positions thereof are established by the absolute encoder and an absolute position value is derived therefrom.

13. The system as claimed in claim 12, wherein the absolute encoder comprises an absolute rotary encoder or an absolute linear position encoder.

14. The system as claimed in claim 12, wherein the absolute position value comprises an absolute angle or an absolute linear position.

15. The system as claimed in claim 12, wherein:
a sensor width of the sensor is equal to or greater than a sum of a code element width and a code element spacing of the code elements.

16. The system as claimed in claim 12, wherein:
a sensor height of the sensor is equal to or greater than a code element height of the code elements.

17. The system as claimed in claim 16, wherein:
the optical code track has an eccentricity; and
in that the sensor height of the sensor is equal to or greater than a sum of:
  the maximum code element height of the code elements; and
  a maximum height offset of the code projection relative to the sensor caused by the eccentricity of the optical code track at different locations.

18. A method for producing the optical code track as claimed in claim 2, comprising:
providing a mechanical support of the optical code track;
applying a coating onto the mechanical support, at least in regions; and
structuring code elements into the coating, which code elements respectively form a main point or centroid and modulate illuminating light,
wherein in that the code elements are structured in such a way that illuminating light is modulated with a continuous variation at adjacent code elements in the direction of extent of the code track.

19. A method for producing the optical code track as claimed in claim 2, comprising:
providing a mechanical support of the optical code track;
generating diffractive structures as the optical code track on the mechanical support, at least in regions; and
structuring code elements into the diffractive structures, which code elements respectively form a main point or centroid and modulate illuminating light,
in that the code elements are structured in such a way that illuminating light is modulated with a continuous variation at adjacent code elements in the direction of extent of the code track.

20. A non-transitory computer program product, stored on a machine-readable medium, comprising program code which is suitable for establishing an object position from absolute coding of an optical code track registered by a system as claimed in claim 12 when the program is loaded into, and executed on, a microprocessor of an evaluation unit.

* * * * *